United States Patent
Hebling et al.

(10) Patent No.: US 10,481,468 B2
(45) Date of Patent: Nov. 19, 2019

(54) METHOD TO GENERATE TERAHERTZ RADIATION AND TERAHERTZ RADIATION SOURCE

(71) Applicant: Pécsi Tudományegyetem, Pécs (HU)

(72) Inventors: János Hebling, Pécs (HU); Gábor Almási, Kozármisleny (HU); László Pálfalvi, Pécs (HU); Levente Tokodi, Magyarszék (HU); József András Fülöp, Pécs (HU); Csaba Márió Lombosi, Pécs (HU)

(73) Assignee: Pécsi Tudományegyetem, Pécs (HU)

( * ) Notice: Subject to any disclaimer, the term of this patent is extended or adjusted under 35 U.S.C. 154(b) by 0 days.

(21) Appl. No.: 16/017,220

(22) Filed: Jun. 25, 2018

(65) Prior Publication Data

US 2018/0373119 A1    Dec. 27, 2018

(30) Foreign Application Priority Data

Jun. 25, 2017  (EP) .................................... 17177757

(51) Int. Cl.
  *G02F 1/35*   (2006.01)
  *G02F 1/365*  (2006.01)
  *G02F 1/355*  (2006.01)

(52) U.S. Cl.
  CPC .......... *G02F 1/3544* (2013.01); *G02F 1/3534* (2013.01); *G02F 1/3551* (2013.01); *G02F 1/365* (2013.01); *G02F 2203/13* (2013.01)

(58) Field of Classification Search
  CPC .... G02F 1/3501; G02F 1/3544; G02F 1/3551; G02F 2001/3503; G02F 2202/20; G02F 2203/13
  See application file for complete search history.

(56) References Cited

U.S. PATENT DOCUMENTS

| 7,272,158 B1 | 9/2007 | Hayes |
| 8,514,482 B2 * | 8/2013 | Okano ................ G01J 3/108 356/328 |

(Continued)

FOREIGN PATENT DOCUMENTS

| JP | 2010139604 | 6/2010 |
| JP | 2014044365 | 3/2014 |
| WO | 2017081501 | 5/2017 |

OTHER PUBLICATIONS

A. Nagashima et al., "Design of Rectangular Transmission Gratings Fabricated in LiNbO3 for High-Power Terahertz-Wave Generation", Japanese Journal of Applied Physics—Erratum, 2012, vol. 51; 2 pages.

(Continued)

*Primary Examiner* — Daniel Petkovsek
(74) *Attorney, Agent, or Firm* — Fitch, Even, Tabin & Flannery LLP

(57) ABSTRACT

A pump beam (12) is subjected to pulse front tilting, and then guided through an imaging optics (30) and then coupled into the nonlinear optical medium through an entry surface of the nonlinear optical medium. THz radiation is generated in the optical medium by nonlinear optical processes, in particular by optical rectification, via the pump beam. The pulse front tilt of the pump beam required to satisfy the velocity matching condition of $v_{p,cs} \cos(\gamma) = v_{THz,f}$ is induced as a sum of a plurality of pulse front tilts, where each pulse front tilt is induced separately as a partial pulse front tilt of the pump beam in subsequent steps. The last step of pulse front tilting of said pump beam (12) is performed by coupling the pump beam (12) into the nonlinear optical medium through a stair-step structure (40) formed in the entry surface of the nonlinear optical medium.

16 Claims, 3 Drawing Sheets

(56) References Cited

U.S. PATENT DOCUMENTS

| | | | |
|---|---|---|---|
| 8,564,875 | B2 | 10/2013 | Kawada |
| 9,024,260 | B2 | 5/2015 | Ouchi |
| 2013/0075629 | A1 | 3/2013 | Doi |
| 2018/0292729 | A1* | 10/2018 | Almasi ................ G02F 1/3534 |

OTHER PUBLICATIONS

A. Nagashima et al., "Design of Rectangular Transmission Gratings Fabricated in LiNbO3 for High-Power Terahertz-Wave Generation", Japanese Journal of Applied Physics, (2010), vol. 49; 6 pages.
Blanchard et al., "Terahertz pulse generation from bulk GaAs by a tilted-pulse-front excitation at 1.8 μm", Applied Physics Letters, (2014), vol. 105; 5 pages.
G.K. Abgaryan et al., entitled "Investigation of Parameters of Terahertz Pulses Generated in Single-Domain LiNbO3 Crystal by Step-Wise Phase Mask" (see Journal of Contemporary Physics (Armenian Academy of Siences), vol. 51, Issue 1, pp. 35-40, 2016; 6 pages.
H. Hirori et al., "Single-cycle terahertz pulses with amplitudes exceeding 1 MV/cm generated by optical rectification in LiNbO3", Applied Physics Letters, (2011), vol. 98, No. 9; 3 pages.
Hebling J. et al., "Velocity matching by pulse front tilting for large-area THz-pulse generation", Optics Express, (2002), vol. 10, No. 21; 6 pages.
International Search Report dated Jun. 6, 2017 for PCT/HU2016/050046; 4 pages.
J. A. Fülöp et al. entitled "Design of high-energy terahertz sources based on optical rectification" (Optics Express, vol. 18., pp. 12311-12327, 2010; 17 pages.
J. A. Fülöp et al., entitled "Efficient generation of THz pulses with 0.4 mJ energy"; Optics Express; vol. 22, issue 17, pp. 20155-20163, 2014; 9 pages.
J. Fiilop et al., "Design of high-energy terahertz sources based on optical rectification: erratum"; Optics Express, vol. 19, No. 23; Nov. 7, 2011; 1 page.
J. Fiilop et al., "Design of high-energy terahertz sources based on optical rectification", Optics Express, (2010), vol. 18, No. 12; 17 pages.
L. Pálfalvi et al, Hybrid tilted-pulse-front excitation scheme for efficient generation of high-energy terahertz pulses; Optics Express; vol. 24, No. 8, Apr. 6, 2016; 14 pages.
L. Palfalvi et al., "Novel setups, for extremely high power single-cycle terahertz pulse generation by optical rectification", Applied Physics Letters, (2008), vol. 92, No. 1; 4 pages.
M. Kunitski et al., "Optimization of single-cycle terahertz generation in LiNb03 for sub-50 femtosecond pump pulses", Optics Express, (2013), vol. 21, No. 6; 11 pages.
Michael I. Bakunov et al, "Terahertz generation with tilted-front laser pulses in a contact-grating scheme"; Journal of the Optical Society of America—B., US, vol. 31, No. 11, Nov. 2014; 10 pages.
Ofori-Okai et al., entitled "THz generation using a reflective stair-step echelon" (see Optics Express, vol. 24, issue 5, pp. 5057-5067, 2016; 12 pages.
Ollmann et al.; entitled Design of a Contact Grating Setup for mJ-Energy THz Pulse Generation by Optical Rectification; Applied Physics B Lasers and Optics; published online Sep. 23, 2012; 6 pages.
Ollmann Z. et al., "Design of a contact grating setup for mJ-energy THz pulse generation by optical rectification", Applied Physics B, (2012), vol. 108, No. 4; 6 pages.
Ollmann Z. et al., "Design of a high-energy terahertz pulse source based on ZnTe contact grating", Optics Communications, (2014), No. 315; 5 pages.
Tsubouchi et al. published in the Conference Proceedings of the "41th International Conference on Infrared, Millimeter and Terahertz Waves (IRMMW-THz)" (Sep. 25-30, 2016) under the title of Compact device for intense THz light generation: Contact grating with Fabry-Perot resonator; 2 pages.
Written Opinion of the International Searching Authority dated May 7, 2017 for PCT/HU2016/050062; 7 pages.

* cited by examiner

METHOD TO GENERATE TERAHERTZ RADIATION AND TERAHERTZ RADIATION SOURCE

CROSS REFERENCE TO RELATED APPLICATIONS

This patent application claims the benefit of European Patent Application No. 17177757.6 filed Jun. 25, 2017, which is incorporated by reference in its entirety as though fully rewritten herein.

TECHNICAL FIELD

The present invention relates to a method to generate terahertz radiation and a respective terahertz radiation source. In particular, the present invention relates to a novel method and setup to generate terahertz pulses with improved beam properties.

BACKGROUND

Nowadays, the acceleration of electrically charged particles, such as e.g. electrons or protons, is a new and promising field of application of intense terahertz (THz) pulses with frequencies in the range of substantially 0.1-10 THz (as per agreement). Terahertz pulses are conventionally generated by coupling ultrashort light pulses, i.e. light pulses having a pulse width in the femtosecond (fs) to picoseconds (ps) domain, into a crystal with nonlinear optical properties, in general, by means of optical rectification within the crystal. To this end, typically pulses of visible or near infrared pump pulses with the pulse width of several hundred femtoseconds are used.

To achieve efficient terahertz radiation generation, the so called velocity matching condition has to be met. This means that the group velocity of the pump pulse used for the generation has to be equal to the phase velocity of the THz pulse thus generated. If said velocities are close to each other, i.e. the group refraction index of the nonlinear crystal at the frequency of the pumping differs from the refraction index in the THz domain only to a reasonably small extent, fulfilment of this condition may be achieved by known means.

The second order nonlinear optical coefficient of the (crystal) material affects decisively the efficiency of terahertz radiation generation. For some materials, in which said coefficient is high (exceeds, typically, several ten pm/V's) and the aforementioned refraction index difference is also high, terahertz radiation generation with velocity matching becomes unachievable. This is the case for several materials: some semiconductors, such as e.g. gallium-phosphide (GaP), zinc-telluride (ZnTe) and also lithium-niobate (LN) and lithium-tantalate (LT) having exceptionally high (160-170 pm/V) nonlinear optical coefficients, wherein the ratio of the group refraction index at the pump frequency and the phase refraction index in the THz domain is greater than two. A solution for the problem is the tilted-pulse-front technique (see the paper by J. Hebling et al., entitled "*Velocity matching by pulse front tilting for large-area THz-pulse generation*"; Optics Express; Vol. 10, issue 21, pp. 1161-1166 (2002)). Accordingly, the generation of terahertz radiation is carried out by a light pulse, whose pulse front (intensity front) is at a desired angle (γ) to the wave front. As the THz beam generated propagates perpendicularly to the tilted pulse front, due to said velocity matching condition, the projection of the group velocity $v_{p,cs}$ of pumping onto the direction of THz radiation propagation has to be equal to the phase velocity $v_{THz,f}$ of the THz beam, that is, the relation of $$v_{p,cs} \cos(\gamma) = v_{THz,f} \qquad (1)$$

has to be met. In particular, for pump wavelengths in the near-infrared domain, this relation is satisfied at γ≈63° for LN, γ≈69° for LT, and γ≈22°-29° for ZnTe, respectively.

At present, the highest energy THz pulses with frequencies suitable for particle acceleration (i.e. of about 0.2-1.0 THz) can be generated by means of LN crystals and using the tilted pulse front technique (see the paper by J. A. Fülöp et al., entitled "*Efficient generation of THz pulses with 0.4 mJ energy*"; Optics Express; Vol. 22, issue 17, pp. 20155-20163 (2014)). The high energy THz radiation sources described in this publication, that produce pulse energies of 0.43 mJ, use a prism shaped LN crystal as the nonlinear optical crystal in each case. The reason for this, on the one hand, is that to minimize the reflection losses, the pump pulse has to enter the crystal perpendicularly and the THz pulse generated has to exit therefrom also perpendicularly. On the other hand, coupling out the THz beam at right angle ensures that the beam is free from angular dispersion that is a very important requirement from the point of view of further utilization. Accordingly, to meet the velocity matching condition (1), the exit plane of the LN crystal has to form a wedge angle with the entry plane of the LN crystal that is equal to the angle γ.

As the wedge angle in the case of LN crystals is large (γ≈63°), at high energy THz generation, making use of the medium for generating THz radiation in the form of a prism is highly detrimental to the quality of the THz beam thus generated, because for a wide pump beam, that is necessary for high energy THz generation, the THz pulses appearing at the two cross-sectionally opposite sides of the pump beam are generated over significantly different lengths, and hence are subject to absorption and dispersion to different extents; moreover, the nonlinear effects are also different in the LN crystal at said locations of generation. Therefore, the intensity of, as well as the temporal electric field profile within the THz pulses generated at portions located symmetrically at the two sides of the pump pulse are significantly different, i.e. a bad quality, highly asymmetric THz beam is obtained. An important criterion for carrying out particle acceleration efficiently is the precise synchronization between the particle to be accelerated and the pulse with a field strength of controllable temporal profile to be used for the acceleration. Hence, the thus obtainable asymmetric THz beam of low beam quality is unfit for the synchronization, and thus for the efficient particle acceleration.

In case of the conventional tilted-pulse-front technique, the pulse front tilt of the pump beam is obtained by diffraction on a (reflection or transmission) optical grating arranged in the beam path. Then the beam is guided, through a lens or a telescope by means of imaging, into a nonlinear crystal for terahertz radiation generation: the image of the beam spot on the surface of the grating is created inside the crystal. Imaging errors of the conventional tilted-pulse-front THz radiation sources cause deformation of the pump pulse, namely, they result in a local elongation of the pump pulse length (see the paper by L. Pálfalvi et al., entitled "*Novel setups for extremely high power single-cycle terahertz pulse generation by optical rectification*"; Applied Physics Letters, Vol. 92, issue 1., pp. 171107-171109 (2008)). In case of pump beams with large cross-section (i.e. wide beams) this effect is highly detrimental to the efficiency of terahertz radiation generation. To remedy this, the above cited scientific publication proposes the use of a so-called contact grating scheme, which is free from any imaging optics and thus from imaging errors generated by the imaging optics. In this scheme the tilt of the pulse front is obtained by diffraction on a transmission optical grating formed directly (e.g. by etching) in the surface of the nonlinear crystal. The magnitude of the period of the grating to be formed (generally, in the micrometer or sub-micrometer domain) is determined by the material of the nonlinear crystal and the wavelength of the pumping. For LN and assuming a pump wavelength of typically ~1 µm, the contact grating has to be provided with a line density of typically at least 2500-3000 l/mm (see the paper by Nagashima et al., entitled "*Design of Rectangular Transmission Gratings Fabricated in LiNbO3 for High-Power Terahertz-Wave Generation*"; Japanese Journal of Applied Physics, vol. 49, pp. 122504-1 to 122504-5 (2010); and the corrected paper entitled "*Erratum: Design of Rectangular Transmission Gratings Fabricated in LiNbO3 for High-Power Terahertz-Wave Generation*"; Japanese Journal of Applied Physics, vol. 51, p. 122504-1 (2012), as well as the paper by Ollmann et al., entitled "*Design of a contact grating setup for mJ-energy THz pulse generation by optical rectification*"; Applied Physics B, vol. 108, issue 4, pp. 821-826 (2012)). At the moment, preparation of an optical grating with this line density is technically not obvious, if it is possible at all. In addition, test experiments show, that if the line density of the grating exceeds a threshold value (which is about 2000 l/mm for LN), the profile of the obtained grating becomes blurred. Consequently, diffraction efficiency of the obtained grating falls greatly behind the theoretically predicted value, which results in a drastic reduction of the efficiency of terahertz radiation generation due to the highly reduced efficiency of coupling in the pump pulse.

A further significant disadvantage of the contact grating scheme lies in the fact that it is not possible to generate terahertz radiation efficiently when a plane-parallel structure is used (contrary to the statements of the aforementioned paper by Pálfalvi et al. from 2008); tilting the entry and exit planes relative to each other and providing, thus, the medium for terahertz radiation generation in the form of a prism-shaped element is unavoidable (see the above cited paper by Ollmann et al. from 2012).

The paper by Tsubouchi et al. published in the Conference Proceedings of the "41th International Conference on Infrared, Millimeter and Terahertz Waves (IRMMW-THz)" (25-30 Sep. 2016) under the title of "*Compact device for intense THz light generation: Contact grating with Fabry-Perot resonator*" discloses a method for generating terahertz pulses by contact grating. In order to increase the efficiency of coupling into the nonlinear crystal provided in the form of a plane-parallel element, a double coating layer acting as a Fabry-Perot resonator is formed between the surface of the crystal and the diffraction grating. Coupling out the obtained THz beam from said plane-parallel structure on the exit plane takes place in a direction other than perpendicular. This is highly disadvantageous in case of THz pulses consisting of a few cycles only and having wide bandwidth: separation of the individual spectral components makes impossible the practical utilization of the THz pulses thus obtained.

The paper by G. K. Abgaryan et al., entitled "*Investigation of Parameters of Terahertz Pulses Generated in Single-Domain LiNbO$_3$ Crystal by Step-Wise Phase Mask*" (see Journal of Contemporary Physics (Armenian Academy of Sciences), vol. 51, issue 1, pp. 35-40 (2016)) teaches a scheme for generating broadband THz radiation in an LN crystal equipped with a separate step-wise prism-like phase mask. Here, the LN crystal is provided as a triangular prism that is equipped with the stepped phase mask made of a material that differs from LN. To obtain the broadband THz radiation, a pumping beam with no initial pulse front tilting is directed through the stepped phase mask to slope the amplitude front of the beam and the obtained pumping beam with a sloping intensity front is then coupled into the LN crystal to perform THz generation. To avoid diffraction distortions caused by the exciting laser pulses of the pumping beam, the mask layers corresponding to the steps of the phase mask can be separated from one another by thin mirror coatings.

The paper by Ofori-Okai et al., entitled "*THz generation using a reflective stair-step echelon*" (see Optics Express, vol. 24, issue 5, pp. 5057-5067 (2016)) discloses a tilted pulse front technique for terahertz radiation generation, wherein pulse front tilt of the pump beam is achieved by reflection on a stepped structure with a period of about one hundred micrometers in magnitude (a scheme using a reflection echelle grating) instead of a diffraction grating with a period falling into the micrometer domain. When being reflected, the pulse front is subject to an average tilt, whose extent is determined by the height and the width of the steps of the stair-step structure. The fine structure of the pulse front will also be stepped, the width of this fine structure is twice the width of the stepped grating, while its height will be equal to the height of the stepped grating. The pulse front tilt required by velocity matching is set by the imaging optics arranged in the propagation path of the pump pulse. The THz radiation thus generated propagates along a direction perpendicular to the envelope of the stepped pulse front within the crystal. Thus, coupling the THz radiation out of the crystal requires a prism with the same wedge angle as in the conventional scheme (see above). Consequently, especially when using wide pump beams needed for high energy terahertz radiation generation, the THz radiation obtained will be asymmetric and thus is unfit for e.g. particle acceleration.

International Publication Pamphlet No. WO 2017/081501 A2 discloses a method and a radiation source for generating terahertz radiation. The solution disclosed is obtained by combining the conventional tilted-pulse-front scheme (see above) with a contact grating. Pulse front tilting takes place preferably in two (or more) separate steps in such a way that the pulse front tilt of the pump beam is divided between the conventional setup and the contact grating. Thus, the imaging error occurring here is greatly reduced relative to that of the conventional scheme. Furthermore, according to model calculations performed for an LN crystal, advantageously a terahertz radiation generation with good efficiency can be achieved even with a line density lower (i.e. under about 2000 l/mm) than the line density needed in the simple contact grating scheme. The radiation source to accomplish the method comprises a pump source for emitting a pump pulse and a nonlinear optical medium for generating THz pulses, wherein the pump source and the nonlinear optical medium define together a light path, said pump pulse travels along this light path from the pump source to the nonlinear optical medium. There are arranged a first optical element having angular-dispersion-inducing properties and imaging optics in said light path one after the other along the propagation direction of the pump pulse. Moreover, in order to induce the pulse front tilt of the pump pulse in more than one steps, at least one further element having angular-dispersion-inducing properties is also arranged in the light path after the first element having angular-dispersion-inducing properties and the imaging optics. The medium for generating terahertz radiation is provided in the form of a prism-shaped element. As a result of dividing the pulse front tilt of the pump beam, the wedge angle of the applied prism becomes lower ($\gamma \approx 30°$ for LN, $\gamma \approx 45°$ for LT) than the wedge angle required by the former solutions, however, it is still large enough to result in the generation of an asymmetric beam being disadvantageous from the aspect of utilization of the terahertz radiation obtained.

SUMMARY

In light of the aforementioned, an object of the present invention is to provide a method and a setup—from now on, a technique—to generate terahertz radiation to be used in practical applications, that allow the generation of terahertz pulses of excellent beam properties (in particular, with a symmetric beam profile) and in a scalable manner. Herein, the term 'scalable' refers to the fact that the radius of the cross-sectional beam spot of the pump beam applied in the terahertz radiation source according to the invention—which is proportional to the desired terahertz pulse energy—can be adjusted between relatively broad limits while maintaining the excellent beam properties of the terahertz radiation generated. In particular, said radius of the beam spot can be varied from a value in the mm domain to a value in the range of several centimeters.

A further object of the present invention is to provide a technique for terahertz radiation generation by means of which the pulse energy and the generation efficiency of THz pulses nowadays available are increased.

A yet further object of the present invention is to provide a technique for terahertz radiation generation by means of which the generation of a terahertz beam substantially free from spatial asymmetry in beam cross-section, even for the case of a wide pump beam, becomes available.

A yet further object of the present invention is to provide a technique to generate terahertz radiation suitable for producing electrically charged particles monochromatic in energy and accelerating said particles efficiently.

Our studies have led us to the conclusion, that the aforementioned objects can be achieved by a novel setup for terahertz radiation generation that is based on fulfilling the velocity matching condition, wherein a first optical element having angular-dispersion-inducing properties, imaging optics and a medium with nonlinear optical properties suitable for generating terahertz radiation are arranged in the propagation path of a pump beam emitted by a pump beam source after (i.e. downstream of) said pump beam source, and wherein the medium with nonlinear optical properties is provided as a light-transmitting (i.e. transparent to the pump beam) plane-parallel crystal defined by an entry plane and an exit plane essentially parallel to each other, and wherein the entry plane itself is formed as a stair-step structure. The period of the stair-step structure is greater by orders of magnitude, preferably at least by one or two orders of magnitude than the pump wavelength of the pump beam source. From now on, we refer to said cross-sectionally stair-step structure that acts as a coupler means of the pump beam into the medium with nonlinear optical properties as a 'stepped contact grating'. Said stepped contact grating consists of steps formed periodically one after the other in an imaginary first direction over the surface of the stair-step structure; each step comprises two shorter edges and one longitudinal edge that is perpendicular to each of the shorter edges; said longitudinal edge is substantially parallel to an imaginary second direction over the surface of the stair-step structure that extends at right angle to the first direction.

Moreover, the stair-step contact grating is arranged to extend transversally to the propagation direction in such a way that an imaginary plane laid on the longitudinal edges of the stairs (i.e. an envelope of said stair-step contact grating) forms a predetermined inclination angle ($\gamma_{NM}$) with a plane perpendicular to the propagation direction. This inclination angle is determined by the geometrical parameters of the individual steps of the stair-step contact grating (i.e. a width w of one of the shorter edges of each step and a height h of the other of the shorter edges of said step, as well as a step angle $\alpha$ that characterizes the tilting of said step; said step angle is an angle of inclination between a first plane defined by one of the shorter edges and the longitudinal edge of a step, and a second plane defined by the other shorter edge and the longitudinal edge of said step). In case of right-angled steps, i.e. with $\alpha = 90°$, the relation of $\gamma_{NM} = a \tan(h/w)$ holds. To fulfil the velocity matching condition within the nonlinear optical medium, said angle of inclination meets adequate geometrical criteria. Namely, the average tilt ($\gamma$) of the pulse front of the pump beam coupled into the medium with nonlinear optical properties and getting segmented as to its pulse front during said in-coupling is substantially equal to the inclination angle of the envelope of the stair-step contact grating (i.e. $\gamma = \gamma_{NM}$ holds). Secondly, in the setup to generate terahertz radiation according to the invention, the pulse front of the pump beam (characterized by an angle of inclination $\gamma_0$), directly before entry of the pump beam into the medium with nonlinear optical properties, is substantially parallel to the envelope of the segmented pulse front (characterized by the average tilt) of the pump pulse within the medium with nonlinear optical properties, i.e. $\gamma_{NM} = \gamma_0$ holds. From now on, the generation setup with the aforementioned geometrical properties will be referred to as hybrid scheme/setup/arrangement.

The technique for generating terahertz radiation according to the invention is a hybrid technique obtained—according to the aforementioned—by a non-obvious combination of a conventional scheme using imaging optics and a stair-step contact grating. The present novel technique is an alternative to the terahertz radiation generation technique disclosed in International Publication Pamphlet No. WO 2017/081501 A2 that comprises imaging optics and a conventional contact grating. The hybrid technique according to the present invention is similar to this previous hybrid scheme in that aspect that although imaging errors are present in the pump beam, the extent of such imaging errors is significantly lower in comparison with that of the conventional scheme. Nevertheless, the technique according to the invention provides a technique that is scalable from the point of view of the terahertz radiation generation. In particular, the technique according to the invention has the great advantage over both the technique of International Publication Pamphlet No. WO 2017/081501 A2 and the further tilted-pulse-front techniques, that it makes use of a medium for the terahertz radiation generation in the form of a crystal having a plane-parallel shape that is essential for achieving a perfect beam quality of the THz beam.

A further advantage of the inventive solution is that, as a consequence of the period of the stair-step contact grating that is greater by orders of magnitude, preferably at least one or two orders of magnitude than that of the high line density conventional contact gratings, the stair-step contact grating used according to the invention can be implemented much more simply and reliably as far the manufacturing is concerned. A yet further advantage is that the pump beam can be coupled into the optical medium with high efficiency. Said in-coupling can even be made more efficient if the individual steps of the stair-step structure are coated with a suitable anti-reflective coating known to a person skilled in the art.

BRIEF DESCRIPTION OF THE DRAWINGS

In what follows, the invention is described in detail with reference to the accompanying drawings, wherein

[FIGS. 4A and 4C: a scheme using reflective echelle grating (for further details, see the paper by Ofori-Okai et al.); FIGS. 4B and 4D: the hybrid scheme according to the invention implemented with a stair-step contact grating] along with changing a free geometric parameter of the reflective echelle grating and the stair-step contact grating (here, the width w of the steps), wherein the various curves in the plots are, respectively, for w=40 μm (with squares), w=60 μm (with circles), w=80 μm (with triangles) and w=100 μm (with reversed triangles).

DETAILED DESCRIPTION

Figure 1:
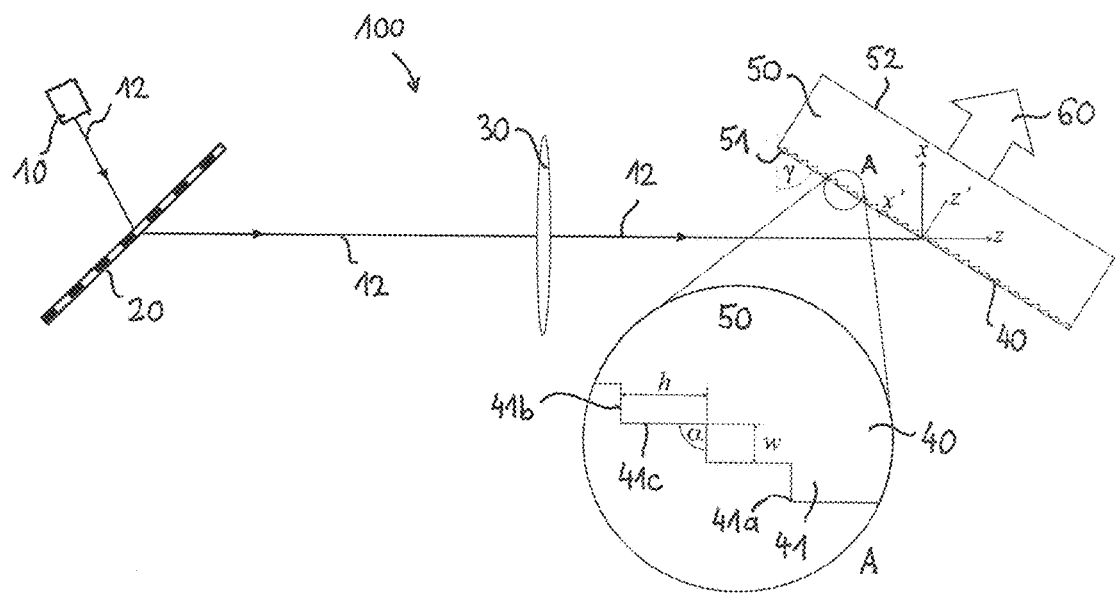
FIG. 1 is a longitudinal sectional view of a hybrid scheme to generate terahertz radiation according to the invention, implemented with a nonlinear optical crystal with an essentially plane-parallel structure.

FIG. 1 shows a preferred exemplary embodiment of a so-called hybrid terahertz beam generating setup/scheme or the radiation source 100 to generate terahertz radiation according to the invention. The radiation source 100 comprises a pump source 10 for providing a pump beam 12, as well as an optical element 50 provided by a medium having nonlinear optical properties to generate terahertz radiation 60. The light transmitting optical element 50 is defined by an exit plane 52 forming an exit surface and an entry plane 51 serving as an entry surface, the exit plane essentially (i.e. within the tolerance of at most about 2°) being parallel with the entry plane; thus the optical element 50 is preferably formed as an element with a plane-parallel structure. The terahertz radiation 60 is produced as a result of the nonlinear optical interaction of the pump beam 12 and the material of the optical element 50, preferably by means of optical rectification, in a thickness L of the optical element 50, then exits the optical element 50 through the exit plane 52 thereof and then it may be subjected to use. In the form of a periodic stepped structure of individual steps 41 characterized by predetermined geometrical parameters, a stair-step contact grating 40 is arranged on the entry plane 51 in perfect optical coupling with said entry plane 51 or formed in the entry plane 51 itself.

The pump source 10 and the optical element 50—as starting and finishing elements, respectively—define a continuous light path that extends between an emission point of the pump source 10 and the entry plane 51. The radiation source 100 comprises in said light path along the direction of propagation of said pump beam first an optical element 20 having angular-dispersion-inducing properties and then imaging optics 30 in suitable geometric arrangement; the optical element 20 and the imaging optics 30, as well as the imaging optics 30 and the stair-step contact grating 40 are arranged at predetermined distances from each other along the light path.

The pump source 10 is preferably a laser source capable of emitting laser pulses—the pump beam 12—in the visible, near- or mid-infrared domain with a pulse length of at most several hundred fs; it is provided e.g. by a diode pumped Yb laser with a central emission wavelength of 1030 nm. Other lasers can also be used as the pump source 10.

The optical element 20 is provided by an optical element inducing angular dispersion of the pump beam 12 incident thereon and transmitted therethrough, and thus cresting a desired tilt (see below) of the pulse front (with preferably zero tilt initially) of the pump beam 12. Accordingly, the optical element 20 is formed by e.g. a transmissive or reflective optical grating, a refraction based optical element (preferably one or more prisms) or a combination thereof (e.g. a prism combined with a diffraction grating, i.e. a so-called grism). In the exemplary embodiment of the radiation source 100 illustrated in FIG. 1, the optical element 20 is preferably a transmissive grating with a predetermined lattice constant, however—as it is obvious to a person skilled in the art—it can also be formed as other angular-dispersive optical elements, e.g. a reflective grating, less preferably a prism etc.

Figure 2:
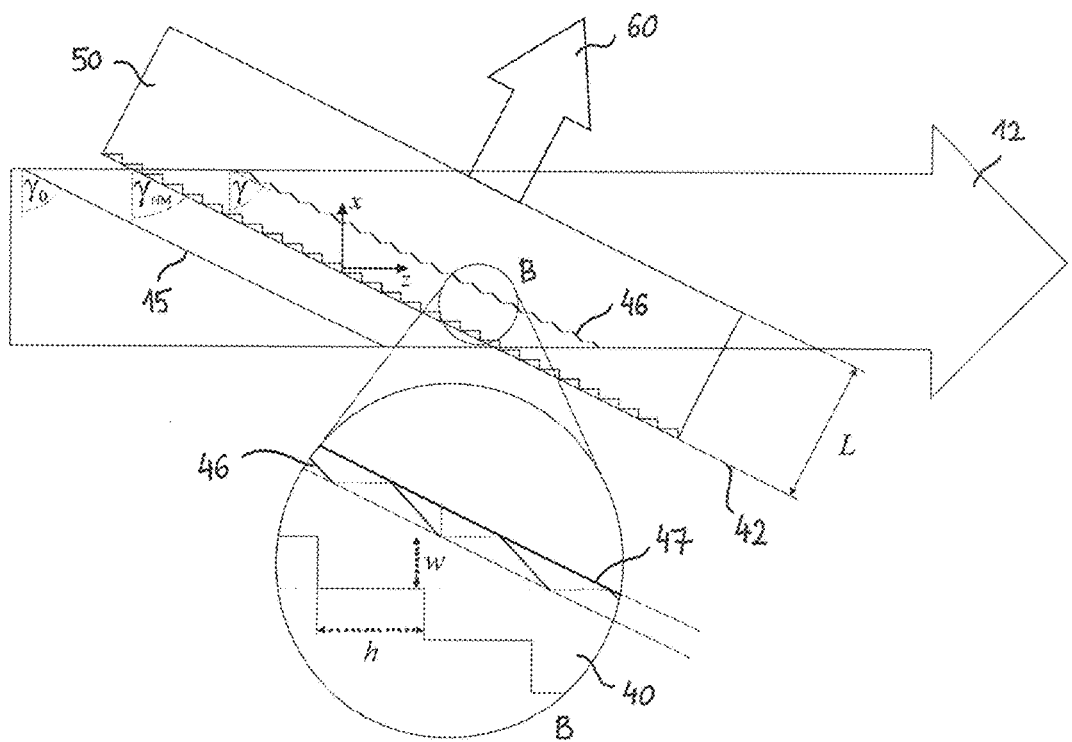
FIG. 2 illustrates the pulse front tilt of the pump beam at entering the nonlinear optical crystal with plane-parallel structure provided with a stair-step contact grating in its entry surface as used in the setup according to the invention shown in FIG. 1.

The imaging optics 30 can be formed by any of the imaging optics known in conventional tilted-pulse-front techniques used for generating terahertz radiation comprising imaging optics. Thus, the imaging optics 30 can be formed e.g. by using a lens, a lens-telescope, a mirror, a mirror-telescope or as a concave mirror, or when using a mirror-telescope, the telescope formed by concave mirrors can be implemented in either a spherical or a cylindrical variant. Any of the optical elements used to form the imaging optics 30 can be implemented with either a spherical, a cylindrical, or a bestform shape (a shape that is minimized as to imaging errors). In the embodiment of the radiation source 100 illustrated in FIG. 2, the imaging optics 30 is provided in the form of a convex lens having a predetermined diameter that receives and transmits the whole cross-sectional beam spot of the pump beam 12. The imaging optics 30 images the pump beam 12 having a pulse front pre-tilted to a desired extent into the optical element 50 through the stair-step contact grating 40, as can be seen in FIG. 2. Particularly, the beam 12 is incident along an optical axis z of the radiation source 100 through the imaging optics 30 onto the stair-step contact grating 40 associated with the optical element 50 locating transversal to the z axis and forming a predetermined angle therewith, and through the contact grating it is transmitted into the volume of the optical element 50 with a segmented pulse front 46 characterized by an average pulse front tilt. The pulse front tilt of the segmented pulse front 46 is equal to the tilt required by the velocity matching condition. The terahertz radiation 60 is generated in the optical element 50 with phase fronts that are parallel with the envelope 47 having the average pulse front tilt of the segmented pulse front 46, thus the propagation direction of the terahertz radiation 60 is necessarily perpendicular to both the entry plane 51 and exit plane 52 of the optical element.

The stair-step contact grating 40 is preferably formed as a periodic stair-step structure by a machining method known to a person skilled in the art (e.g. by etching). Each step 41 of the stair-step structure 40 comprises a first shorter edge 41b, a second shorter edge 41c and a longitudinal edge 41a extending perpendicular to both edges 41b, 41c. The steps 41 are each characterized by the h height of the edge 41b, the width w of the edge 41c and the step angle α formed between a limiting plane defined by the edges 41b and 41a and the limiting plane defined by edges 41c and 41a, shown by the enlarged portion A of FIG. 1. The longitudinal edges 41a of the steps 41 of the stair-step contact grating 40 are lying in the same common plane, which is, from now on, referred to as envelope 42. In the embodiment of the radiation source 100 shown in FIG. 1, the step angle α is substantially (i.e. within the tolerance of the manufacturing process used to fabricate the stair-step contact grating 40) 90°, thus in this case, the two limiting planes of each step 41 are perpendicular to each other, i.e. the steps 41 are formed as right-angled steps. In the case of different embodiments, the step angle α may slightly larger than 90° (by at most about 15°, preferably by at most about 10°, more preferably by at most just a few degrees), i.e. it may be an obtuse angle; each step may be 'tilted' until the light transmitting property of the obtained periodic structure, i.e. the stair-step contact grating 40, or the efficiency of terahertz radiation generation is significantly reduced. In case of right-angled steps 41, said envelope 42 forms an angle $\gamma_{NM}$ with each edge 41b having width w of each step 41, which can be calculated by exploiting basic geometric principles using the relation of $\gamma_{NM}$=a tan(h/w). The period length of the stair-step contact grating 40 in the direction of the steps, i.e. the width w of the individual steps 41, is several orders of magnitudes, preferably by at least one or two orders of magnitude larger than the wavelength of the pump beam 12 used to generate terahertz radiation. More preferably, said period of the stair-step contact grating 40, i.e. the width w, is between at least several times tenfold and at most several hundredfold of the wavelength of the pump beam 12. Fabricating optical structures with microstructures corresponding to such period lengths is much simpler than fabricating optical gratings with line densities of 2000-3000 l/mm. To improve the efficiency of coupling-in light, outer limiting planes of the steps 41 of the stair-step contact grating 40 might be optionally coated with an anti-reflective coating.

The optical element 50 is made of a material with an outstandingly high nonlinear optical coefficient, that is, practically of at least 1 pm/V, typically exceeding several times 10 pm/V, and refractive indices that significantly differ from each other in the terahertz and visible domains, i.e. the ratio of the refractive indices in the two domains is more than 1, preferably more than 1.1, more preferably more than 1.2 in practice. The optical element 50 is preferably made of lithium-niobate or lithium-tantalate, and semiconductor materials, e.g. GaP or ZnTe, preferably with a crystal axis orientation that is the most advantageous for the efficiency of nonlinear optical interactions, thus e.g. for terahertz radiation generation by means of optical rectification. Furthermore, to reduce reflection losses and to avoid angular dispersion of the generated terahertz radiation 60, the exit plane 52 forming an exit surface in the optical element 50 is configured to emit the radiation from the optical element 50 through the exit plane 52 at right angle.

FIG. 2 and its enlarged portion B illustrate schematically the pulse front 15 of the pump beam 12 to generate terahertz radiation before the pump beam 12 reaches the stair-step contact grating 40, and the pulse front 46 of the same just after the pump beam 12 has been transmitted through the stair-step contact grating 40 in the terahertz radiation generation process. The pulse front 15 has a tilt $\gamma_0$ relative to the phase front of the pump beam 12, i.e. the pump beam 12 is a beam that is pre-tilted to a certain extent as to its pulse front. It is the pre-tilt of the pulse front 15 and the suitable extent of the pre-tilting (the value of $\gamma_0$) that allow the optical element 50 of the terahertz radiation source 100 according to the invention to be formed as a substantially plane-parallel crystal, and thus the generation of a THz beam that is substantially symmetric in its physical properties. In case of the radiation source 100 according to the invention, the pre-tilting (to desired extent) of the pulse front 15 of the pump beam 12 is preferably carried out by an optical element 20 having angular-dispersive properties and imaging optics 30 arranged subsequently. The pulse front 46 of the pump beam 12 coupled into the optical element 50 is tilted relative to the phase front of the pump beam 12 in the crystal. As a result of the stair-step configuration of the stair-step contact grating 40 used for the coupling-in, the pulse front 46 is segmented, and its tilt varies (also periodically) from point to point along the pulse front 46. Thus, the tilt of the pulse front 46 can be characterized by an average tilt angle γ. The tilt angle γ is defined as the angle between the phase front of the pump beam 12 within the crystal and the envelope 47 of the pulse front 46 shown in the portion B.

To achieve good beam quality of the terahertz radiation 60 when generating tetrahertz radiation in the optical element 50 the pump beam 12 is coupled into the stair-step contact grating 40 perpendicularly to the limiting planes of width w of the steps 41 of the star-step contact grating 40;

the velocity matching condition is satisfied in the optical element 50 with a plane-parallel structure, i.e. $v_{p,cs} \cos(\gamma) = v_{THz,f}$, where $v_{p,cs}$ is the group velocity of the pump beam 12, $v_{THz,f}$ is the phase velocity of the terahertz pulse, and γ is the tilt of the pulse front of the pump beam 12 relative to the phase front of the pump beam 12; and the terahertz radiation 60 generated exits the optical element 50 perpendicularly to the exit plane 52 of the optical element 50 (see FIG. 1), thus reflection losses are reduced to the minimum, and the terahertz radiation 60 is free from angular dispersion.

The above conditions require the fulfilment of corresponding geometric conditions, i.e.

(i) the envelope 42 of the stair-step contact grating 40 has to be parallel with the envelope 47 of the segmented pulse front 46, i.e. $\gamma = \gamma_{NM}$=a tan(h/w); and (ii) the average tilt of the segmented pulse front 46 has to be equal to the pre-tilt of the pump beam 12 prior to being coupled into the optical element 50, i.e. $\gamma = \gamma_0$.

If the above geometric conditions are satisfied, terahertz radiation generation takes place by using a plane-parallel crystal of nonlinear optical properties with high terahertz-generation efficiency and perfect terahertz beam quality (a terahertz pulse is obtained, the parameters of which are free from asymmetries). The thus obtained THz radiation is free from angular dispersion.

As it is obvious, by selecting the material of the nonlinear optical medium and the pump source 10, the aforementioned geometrical parameters become uniquely fixed. If the optical element 50 is chosen to be an LN crystal, γ≈63° applies, and thus the parameters of the steps 41 of the stair-step contact grating 40 will satisfy the relation h/w≈1.96261. Choosing now the pump wavelength of the pump source to be about 1 μm, the absolute length of the width w can be set at about 30-100 μm. Hence, the stair-step contact grating 40 with the required dimensions can now be manufactured.

It should be here noted, that based on the fact that the pulse front tilt of the pump beam before entry into the optical medium with nonlinear optical properties and in the optical medium itself is the same, it is false to conclude that the stair-step structure used in the hybrid scheme according to the invention would have no role in tilting the pulse front. Namely, if the pump beam entered the optical medium through a planar surface at right angle, the tilt of the pulse front would decrease: the tangent of the tilt within the optical medium would be $n_{p,cs}$ times lower than the tangent of the tilt prior to entry into the optical medium, where $n_{p,cs}$ is the group refraction index of the optical medium with nonlinear optical properties at the pump wavelength. In particular, if e.g. an LN crystal is used as the optical medium with nonlinear properties, the conventional first optical element having angular-dispersion-inducing properties and the stair-step contact grating itself provide about the same contribution to the pulse front tilt required by the velocity matching condition, because for LN, $n_{p,cs}≈2$ applies.

Putting this another way, the stair-step contact grating used in the hybrid scheme according to the invention keeps the pulse front tilt of the pump beam at a constant value if the geometrical parameters of the steps are suitably chosen, wherein said tilt has been set previously (preferably by the first optical element having angular-dispersion-inducing properties and/or the imaging optics) in order to meet the velocity matching condition required for an optimal THz radiation generation with high efficiency within the optical medium for generating terahertz radiation, said constant value of the tilt is uniquely determined by the material of the optical medium to be used.

Figure 3A:
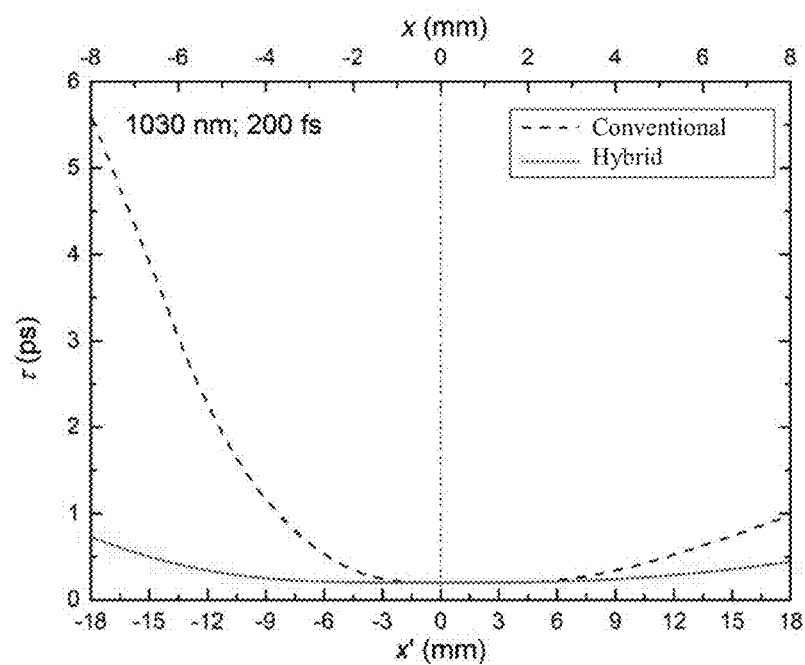
FIGS. 3A and 3B show the local pump pulse length (pulse widening) of a transformation-limited pump pulse with a pump wavelength of $\lambda_0=1030$ along the pulse front (direction x'), i.e. along a transversal direction perpendicular to the propagation direction of the pump pulse, for different initial pulse lengths (200 fs in FIG. 3a; 500 fs in FIG. 3b) in a conventional scheme and in a hybrid scheme according to the invention.
Figure 3B:
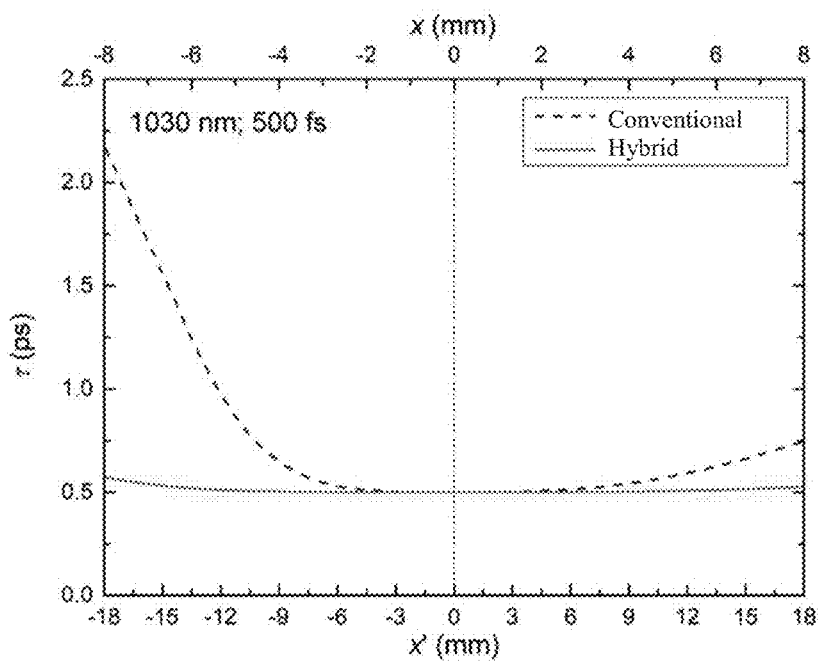

FIG. 3 shows the local pump pulse length (pulse widening) of a transformation-limited pump pulse with a pump wavelength of $\lambda_0$=1030 along the pulse front (direction x', see FIG. 1), i.e. along a transversal direction perpendicular to the propagation direction of the pump pulse, for different initial pulse lengths (200 fs in FIG. 3a; 500 fs in FIG. 3b) in a conventional scheme and in a hybrid scheme for terahertz beam generation according to the invention. Theoretical details of how FIGS. 3a and 3b have been derived, the mathematical approximations and considerations can be found in e.g. the paper by J. A. Fülöp et al. entitled "*Design of high-energy terahertz sources based on optical rectification*" (Optics Express, vol. 18., pp. 12311-12327 (2010)). FIG. 3 shows the calculated pump pulse widening of the pump beams directly before the pump beams enter the LN optical crystal. FIG. 3 also shows, that by using the hybrid scheme according to the invention, the pump pulse widening due to the imaging errors occurring, in particular, in pump pulses of larger spot sizes (and of high pulse energies essential for high energy terahertz radiation generation) and leading to THz beams with asymmetric properties in the terahertz generation can be significantly reduced.

Figure 4:
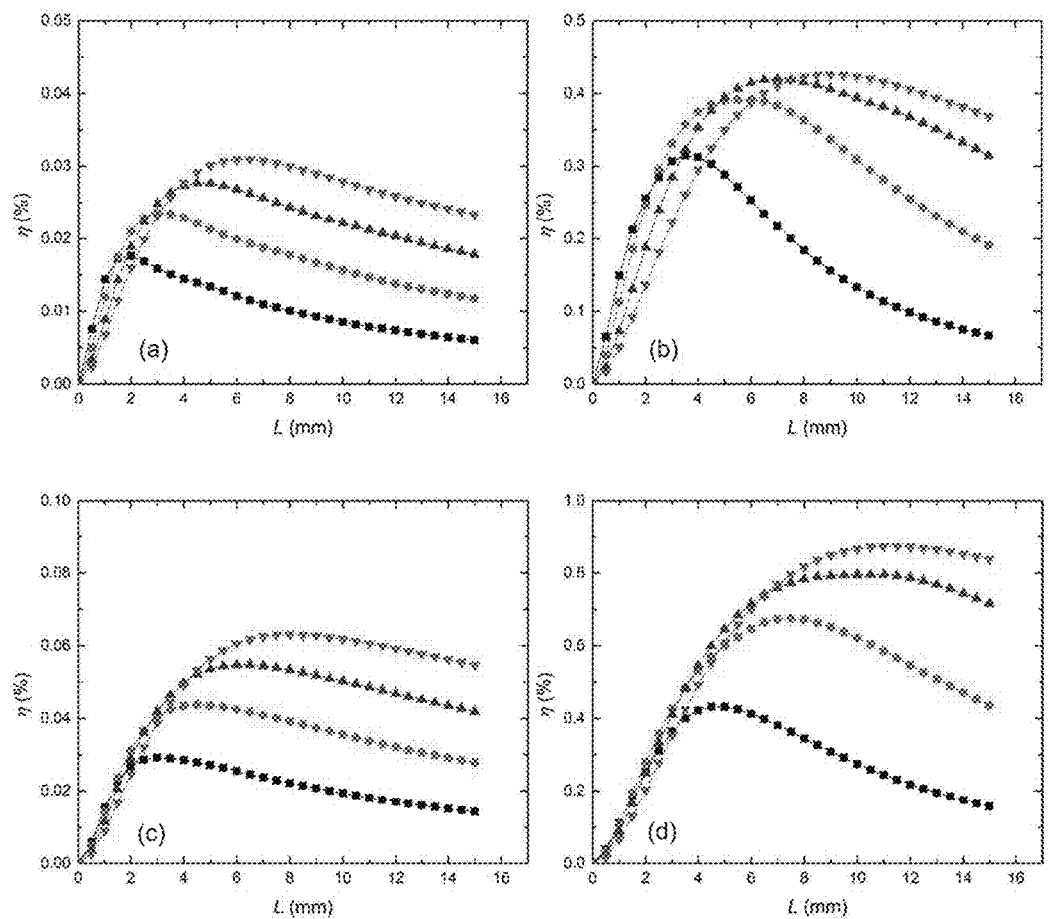
FIGS. 4A, 4B, 4C, and 4D illustrate the efficiency ($\eta$) of terahertz radiation generation as a function of the thickness (L) of the optical medium for a transformation-limited pump pulse with a pump wavelength of $\lambda_0=1030$ nm and for different pulse lengths [200 fs in FIGS. 4A and 4B; 500 fs in FIGS. 4C and 4D], using the pump pulse in model calculations that correspond to various terahertz radiation generating schemes

FIG. 4 shows a couple of examples of the efficiency η of terahertz radiation generation as a function of the thickness L of the optical medium for transformation-limited pump pulses with a pump wavelength of $\lambda_0$=1030 nm and for different pulse lengths [200 fs in FIGS. 4A and 4B; 500 fs in FIGS. 4C and 4D], using the pump pulse in model calculations that correspond to different terahertz radiation generating schemes [FIGS. 4A and 4C: a scheme that uses a reflective echelle grating (see the paper by of Ofori-Okai et al.); FIGS. 4B and 4D: the hybrid scheme according to the invention implemented with a stair-step contact grating], in case of using an LN crystal, along with changing a free geometric parameter of the reflective echelle grating and the stair-step contact grating (here, the width w of the individual steps), wherein the various curves in the plots are, respectively, for w=40 μm (with squares), w=60 μm (with circles), w=80 μm (with triangles) and w=100 μm (with reversed triangles). The detailed description of the mathematical model forming a background for the derivation of each curve can be found in a separate scientific publication of the inventors to be published in the future, which goes beyond the limits of the present application. However, it can be clearly seen in FIG. 4, that the theoretical calculations predict that the terahertz generation efficiency η in a certain configuration, which practically exists and is used for terahertz radiation generation, increases in the case of the hybrid scheme according to the invention by about an order of magnitude relative to the conventional generation schemes, in this case the one described in the paper by Ofori-Okai et al. Moreover, just as an example, according to the calculations, by making use of pump pulses having 50 mJ pulse energies, 500 fs pulse length and 8 mm beam spot radius, performing the terahertz radiation generation in LN crystals, THz pulses with pulse energies of 0.5 mJ can be generated at a generation efficiency of about 1%.

Summary: a novel generating scheme for generating high energy terahertz radiation is developed by combining the conventional pulse-front-tilting based technique with a transmissive stair-step contact grating for coupling the pump pulse into a nonlinear optical crystal, wherein the period of the stair-step structure ranges between several times tenfold an several times hundredfold of the wavelength of the pump beam. The greatest advantage of the novel scheme is that the optical crystal can be used in the scheme in the form of a plane-parallel shaped unit if certain simple geometrical criteria are met. As a result, THz beams with excellent beam qualities and symmetric in their physical properties can be generated at improved generation efficiencies. The terahertz radiation source and method according to the invention based on said novel scheme are particularly advantageous for the generation of high energy THz radiation that requires the application of wide pump beams.

The invention claimed is:

1. A method to generate terahertz radiation in a nonlinear optical medium, the method comprising:
    subjecting a pump beam to pulse front tilting by inducing a tilted pulse front of the pump beam as a sum of a plurality of pulse front tilts to satisfy a matching condition of $v_{p,cs} \cos(\gamma) = v_{THz,f}$ including inducing individual ones of the plurality of pulse front tilts separately as a partial pulse front tilt of the pump beam in subsequent steps comprising at least a first step and a second step, where $v_{p,cs}$ is a group velocity of the pump beam, $v_{THz,f}$ is a phase velocity of the THz pulse, and γ is an angle formed between the pulse front and the phase front of said pump beam,
    guiding the pump beam with tilted pulse front through imaging optics,
    coupling the pump beam with the tilted pulse front into the nonlinear optical medium through an entry surface of the nonlinear optical medium, performing a step of the subsequent steps of inducing the individual ones of the plurality of pulse front tilts by coupling the pump beam into the nonlinear optical medium through a stair-step structure formed in the entry surface of the nonlinear optical medium, generating THz radiation using the optical medium in nonlinear optical processes as a result of the pump beam, and passing the THz radiation through an exit surface of the nonlinear optical medium that is parallel within about two degrees to the entry surface of the nonlinear optical medium.

2. The method according to claim 1, further comprising providing the pump beam by a laser pulse in a visible, near- or mid-infrared domain with a pulse length of at most several hundred femtoseconds.

3. The method according to claim 1 further comprising guiding said pump beam through an optical element with angular-dispersion-inducing properties, wherein said optical element with angular-dispersion-inducing properties is chosen from a group consisting of a diffraction based optical element, a refraction based optical element, and an optical element implemented as a combination thereof.

4. The method according to claim 1, wherein the imaging optics is chosen from a group consisting of a lens, a lens-telescope, a mirror, a mirror-telescope, and a concave mirror.

5. The method of claim 1, the generating THz radiation comprises generating the THz radiation by optical rectification.

6. A terahertz radiation source, comprising:

a pump source configured to emit a pump beam, and a nonlinear optical medium configured to generate THz pulses and including a stair-step structure formed in an entry surface of the nonlinear optical medium and an exit surface that is parallel within about two degrees to the entry surface of the nonlinear optical medium, wherein the pump source and the nonlinear optical medium define together a light path, said light path being arranged so as to guide said pump beam from the pump source to the entry surface of the nonlinear optical medium, an optical element with angular-dispersion-inducing properties, and an imaging optics, wherein the optical element and the imaging optics are arranged in said light path after each other in a propagation direction of the pump beam, and the stair-step structure formed in the entry surface of the nonlinear optical medium is arranged after the optical element and the imaging optics in the propagation direction of the pump beam.

7. The terahertz radiation source according to claim 6, wherein the stair-step structure is made of a same material as the nonlinear optical medium and comprising steps arranged periodically one after the other in a first direction on a surface of the stair-step structure, each of said steps having two shorter edges and one longitudinal edge, said longitudinal edge extending perpendicularly to both of the two shorter edges.

8. The terahertz radiation source according to claim 7, wherein limiting planes of the steps forming the stair-step structure are perpendicular to one another, said limiting planes being defined by one of the two shorter edges and the longitudinal edge, and by an other one of the two shorter edges and the longitudinal edge.

9. The terahertz radiation source according to claim 7, wherein dimensions of the two shorter edges of the steps forming the stair-step structure are larger by at least one order of magnitude than a wavelength of the pump beam.

10. The terahertz radiation source according to claim 9, wherein the dimensions of the two shorter edges of the steps forming the stair-step structure are larger by at most two orders of magnitude than the wavelength of the pump beam.

11. The terahertz radiation source according to claim 6, wherein the optical element is selected from the group consisting of a diffraction based optical element, a refraction based optical element, and an optical element implemented as a combination thereof.

12. The terahertz radiation source according to claim 6, wherein the imaging optics is selected from the group consisting of a lens, a refracting telescope, a mirror, a reflecting telescope, and concave mirrors.

13. The terahertz radiation source according to claim 6, wherein the nonlinear optical medium comprises a material having a nonlinear optical coefficient of at least 1 pm/V, and having a ratio of refraction indices in the terahertz and the visible domains greater than 1.

14. The terahertz radiation source according to claim 6, wherein the nonlinear optical medium is a lithium-niobate ($LiNbO_3$) or a lithium-tantalate ($LiTaO_3$) crystal.

15. The terahertz radiation source according to claim 6, wherein the pump beam is provided by a laser pulse in a visible, near- or mid-infrared domain with a pulse length of at most several hundred femtoseconds.

16. The terahertz radiation source according to claim 6, wherein the nonlinear optical medium comprises a plane-parallel structure.

* * * * *